United States Patent [19]

Makarov et al.

[11] Patent Number: 5,604,205
[45] Date of Patent: Feb. 18, 1997

[54] BIOPREPARATION RIAL AND METHOD FOR FEEDING VARIOUS GROUPS OF ANIMALS, POULTRY AND BEES

[75] Inventors: Nikolai V. Makarov; Galina J. Zharkova; Ljubov J. Ryabinina, all of Moscow, Russian Federation

[73] Assignee: Aktsionernoe Obschestvo Zakrytogo Tipa "Biotekhinvest", Russian Federation

[21] Appl. No.: 362,532

[22] PCT Filed: May 5, 1994

[86] PCT No.: PCT/RU94/00099

§ 371 Date: Jan. 5, 1995

§ 102(e) Date: Jan. 5, 1995

[87] PCT Pub. No.: WO94/24885

PCT Pub. Date: Nov. 10, 1994

[30] Foreign Application Priority Data

May 5, 1993 [RU] Russian Federation ........ 93025986.15

[51] Int. Cl.$^6$ ................ A23J 3/32; A23K 1/04; A23K 1/10; A61K 38/01

[52] U.S. Cl. ................ 514/21; 424/600; 426/437; 426/657; 530/343

[58] Field of Search ................ 424/520, 529, 424/600; 554/19; 514/2, 21; 530/343; 426/657, 437

[56] References Cited

U.S. PATENT DOCUMENTS 3,898,329  8/1975  Said et al. ................ 514/12
3,929,890  12/1975  Pfister ................ 530/407
4,801,444  1/1989  Kravchenko ................ 514/332
4,942,155  7/1990  Cassinelli et al. ................ 536/6.4
5,102,987  4/1992  Cornet et al. ................ 530/427

FOREIGN PATENT DOCUMENTS 2574630  6/1986  France.
3128503  1/1983  Germany.
1340715  9/1987  Russian Federation.
1530163  12/1989  Russian Federation.
1695869  12/1991  Russian Federation.
1699401  12/1991  Russian Federation.
1489447  10/1977  United Kingdom.

*Primary Examiner*—Jeffrey E. Russel
*Attorney, Agent, or Firm*—Ostrolenk, Faber, Gerb & Soffen, LLP

[57] ABSTRACT

The RIAL biopreparation contains free and fixed amino acids, lipids, macronutrients and microelements, compounds of non-metals, carbohydrates and moisture in the following proportions, 30–40, 30–55, 0.01–2, 2–6, 0.5–1.5, 8–12, 0.001–0.1, 4–10 wt.-%, respectively. The method for feeding various groups of animals, poultry and bees involves introducing the RIAL biopreparation into their basic ration. The dose of the preparation used in animal breeding is 10–100 mg/kg of body weight. In poultry farming, the dose is 330–625 g/t of feed. In apiculture, the RIAL preparation is introduced into sugar syrup in a dose of 50–150 mg/l of syrup.

9 Claims, No Drawings

BIOPREPARATION RIAL AND METHOD FOR FEEDING VARIOUS GROUPS OF ANIMALS, POULTRY AND BEES

FIELD OF ART

The present invention relates to applied biotechnology, ecology, processing of animal and biological raw materials, animal breeding and, more specifically, it relates to a biopreparation of a wide range of application and to its utilization as a food addition.

BACKGROUND OF THE INVENTION

At present, anthropogenic abuse of nature has brought about an overall ecological pollution which resulted in a reduction of natural resistance of the animal organism and spreading of animal diseases.

In this connection, great importance should be attached to the problem of improving the protective forces of the animal organism including the use of biologically active preparations.

The stimulating preparations resorted to in animal breeding contribute to raising the natural resistance of the organism, and to accelerated growth and development of animals.

Biologically active preparations added to fodder increase the biotonus of the organism, normalize metabolism, improve the physiological condition and reproductive functions of animals and poultry.

Known in the prior art is a number of biological preparations produced by hydrolysis (FRG Application No. 3128503, A61K35/26; U.S. Pat. No. 3,898,329, A61K37/00; Application of France No. 2574630, A23K1/10).

The above-cited preparations have a number of inherent disadvantages, namely: insufficient stimulating effect, narrow range of application and, limited group of treated agricultural animals. In addition, it should be noted that these preparations are available in a liquid form which involves certain difficulties in their administration.

Known in the prior art is a biostimulant "Splenivita" prepared from animal spleen (USSR Inventor's Certificate No. 1695869, A23K1/00, 1991). However, this stimulant features an insufficient activity and a comparatively narrow field of action.

Also known in the prior art is an albuminous hydrolysate prepared from waste of fur and leather manufacture (USSR Inventor's Certificate No. 1699401, A23J1/10, 1991). From the viewpoint of its composition, said hydrolysate is closest to the claimed preparation though is less active and has a smaller range of application.

As for the field of application of the claimed preparation, it is pertinent to note the following.

There is a known method for fattening broiler chickens (USSR Inventor's Certificate No. 1340715, USSR Inventor's Certificate No. 1340715, A23K1/00, 1987) wherein the food ration is enriched by introducing aminobutyric acid in the capacity of a biostimulant.

A disadvantage of this method lies in its low efficiency.

Also known is a method of poultry feeding (USSR Inventor's Certificate No. 1530163, A23K1/16, 1989) which involves enriching the food ration with a biostimulant in the form of egg mass. However, this method is likewise poorly effective.

Thus, the problem of developing an effective biopreparation used in animal breeding as a biostimulating feed addition still remains of vital importance.

DISCLOSURE OF THE INVENTION

The main object of the disclosed group of inventions resides in providing a biopreparation featuring the property of a highly-effective multipurpose biostimulant and in developing a method of using said biopreparation in the food ration of various groups of animals, poultry and bees.

This object is attained by providing a biopreparation RIAL developed by destructive conversion of inedible biological materials of different origin, containing free and fixed amino acids, lipids, macronutrients, microelements, non-metal compounds, carbohydrates and moisture in the following proportions, wt.–%:

| Amino acids: | |
| --- | --- |
| free | 30–40 |
| fixed | 30–55 |
| Lipids | 0.01–2 |
| Macronutrients | 2–6 |
| Microelements | 0.5–1.5 |
| Non-metal compounds | 8–12 |
| Carbohydrates | 0.001–0.1 |
| Moisture | 4–10 |

Amino acids are a product of albuminolysis wherein the term "free amino acids" is understood as natural 1-aminoacids while fixed amino acids as the fragments of hormones, # enzymes and other lower peptides.

The macronutrients in the RIAL biopreparation are represented by iron, calcium, sodium, potassium, phosphorus, magnesium, sulfur, chlorine, while microelements, by manganese, zinc, copper, antimony, arsenic, tin, molybdenum, bismuth, etc.

The non-metal compounds contain fats, purines, pyrimidines, and fragments of polysaccharides while carbohydrates are constituted by monosugars.

The biopreparation thus comprises organic and inorganic parts. The organic part includes free and fixed amino acids, lipids and other organic compounds (purines, pyrimidines, fragments of polysaccharides in the form of oligo- and monosaccharides). The inorganic part comprises metals and non-metals which can be divided into macro and microelements.

The newest drying equipment is capable of producing RIAL biopreparation with a lower moisture content.

The biopreparation is, essentially, a hygroscopic powder with a slight specific odor, varying in color from light-yellow to brown.

The RIAL is nontoxic, readily assimilated and easily mixed with water and feed.

The RIAL biopreparation is a natural complex of organic and inorganic compounds containing the balanced quantities of natural 1-amino acids, monosugars, lower peptides, carbohydrates, lipides, fragments of vitamins, hormones, enzymes, a set of macronutrients and microelements. Actually, all these substances form the living matter which, after decomposition of biological systems, is again split back into these substances. The RIAL preparation contains an optimum proportion of biologically active components.

The technical result of using the RIAL biopreparation in the capacity of a feed addition increases the biotonus of the organism and normalizes metabolism which enhances working capacity and endurance, natural resistance and productivity of animals, poultry and bees.

The vital importance of the present invention is due to the fact that the RIAL biopreparation can be produced from nonstandard animal raw materials whose utilization relieves harmful ecological load on environment.

The process of producing the RIAL biopreparation involves the use of whole or disintegrated carcasses of weak, frost-bitten, sick, perished and other categories of animals, or some other biological material (e.g. blood). The processed protein loses completely its specific features and antigenic properties. All initial feedstuff is converted into a useful product without any waste and renders this process ecologically clean.

The production process includes the following stages:

1. Homogenization (if necessary) of source materials—protein-containing waste of animal husbandry.
2. Acidic hydrolysis of source materials in 5–20% sulfuric acid at 90°–110° C. for 5–15 h.
3. Filtering of acidic hydrolysate.
4. Alkaline hydrolysis of residue non-dissolved in acid with calcium oxide at 95–105 C. for 3–5 h.
5. Combining and mixing the acidic and alkaline hydrolysates.
6. pH correction (if necessary).
7. Filtration.
8. Concentration of filtrate.
9. Drying of concentrated solution.
10. Packing.

When the RIAL biopreparation is produced from blood, the homogenization, alkaline hydrolysis and, correspondingly, subsequent filtration stages are left out from the production process.

The Table 1 below gives the composition of the RIAL biopreparation produced by the above method from animal raw materials (rabbit carcasses,) and biological materials (cattle blood).

TABLE 1

Composition of RIAL Biopreparation Produced from Various Raw Materials

| Ingredients | Blood, wt.-% | Rabbit, carcasses, wt.-% |
| --- | --- | --- |
| Amino Acids | 65–67 | 65–67 |
| Lipids | 2 | 1.9 |
| Macronutrients | 2 | 2.3 |
| Microelements | 0.5 | 0.8 |
| Non-metal compounds | 8–11 | 9.5 |
| Carbohydrates | 0.05 | 0.1 |
| Moisture | 4.5–4.8 | 4.5 |

Table 2 gives a comparative analysis of amino acid composition of the biopreparation made of animal carcasses than cannot be processed into food products, from blood and dry blood.

TABLE 2

Content of Amino Acids in the RIAL Biopreparation

| Amino acids | Waste, mg % | Blood, mg % | Dry blood, mg % |
| --- | --- | --- | --- |
| Aspartic acid | 8.044 | 9.56 | 9.12 |
| Threonine | 3.372 | 0.79 | 1.43 |

TABLE 2-continued

Content of Amino Acids in the RIAL Biopreparation

| Amino acids | Waste, mg % | Blood, mg % | Dry blood, mg % |
| --- | --- | --- | --- |
| Serine | 3.546 | 1.68 | 2.1 |
| Glutamic acid | 7.3 | 3.97 | 4.86 |
| Proline | 3.39 | — | — |
| Glycine | 3.082 | 2.35 | 2.33 |
| Alanine | 5.774 | 3.23 | 3.39 |
| Valine | 5.955 | 1.48 | 1.68 |
| Methionine | 1.024 | 0.27 | 0.61 |
| Isoleucine | 0.833 | 0.37 | 0.42 |
| Leucine | 8.886 | 2.24 | 3.53 |
| Tyrosine | 1.075 | 6.87 | 6.92 |
| Phenylalanine | 4.674 | — | — |
| Lysine | 6.864 | 1.32 | 1.87 |
| Histidine | 5.706 | 2.47 | 2.2 |
| Arginine | 4.276 | 3.45 | 3.23 |
| Cysteine | 0.712 | — | — |

BEST MODE OF CARRYING OUT THE INVENTION

The RIAL biopreparation of the above-mentioned composition is used as a feed addition to improve the working capacity and endurance of horses, to increase natural resistance, productivity and reproductive capacities of pigs, sheep, fur farming animals, poultry and bees.

In horse-breeding, the preparation is mixed with concentrated feeds or is added to cooked grain and given once daily at the rate of 30 mg/kg of body weight.

If the preparation is administered in excess of two months, it is practicable that it be given by ten-daily courses with 10-day intervals or every other day.

In pig breeding, the preparation is fed daily as a part of regular ration in the following doses:

sows—25–40 mg/kg of body weight 15 days before and 30 days after farrowing;

piglets—30–50 mg/kg of body weight in the course of a month.

In sheep breeding, the preparation is fed to pregnant ewes in a mixture with concentrated feeds daily in the morning in the course of 30 days before lambing in a dose of 30 mg/kg of body weight.

The lambs are given the preparation individually, 2–3 h after the birth and in the course of the first month of life by forced administration in a dose of 10 mg/kg of body weight in the form of a solution in clean boiled water from a Janet syringe, daily or every other day.

After the first month the lambs are given the RIAL biopreparation mixed with concentrated feeds, daily for 30 days in a dose of 10 mg/kg of body weight.

The tupping rams are given the preparation individually in the form of a solution in clean boiled water in the course of 50–55 days before insemination through a Janet syringe and a rubber tube in a dose of 10 mg/kg of body weight.

Within the period of intensive sexual exploitation of tupping rams, the dose may be brought to 30 mg/kg of body weight.

The dose of the preparation given to rams with a low sexual potency is increased to 50 mg/kg while after restoring the reproductive function, it is reduced to the normal limit, i.e. 30 mg/kg of body weight.

When tupping rams are subjected to mass treatment before artificial insemination, the biopreparation may be administered in a mixture with concentrated feeds provided the animals are equalized in groups by the body weight.

In fur farming, the biopreparation is given in a mixture with the regular ration.

Minks—ten-daily, a dose of 50 mg/kg of body weight:
male minks in the pre-rutting and rutting periods;
female minks—in the pre-rutting and rutting periods, during pregnancy and nursing of cubs;
young minks—from weaning to slaughtering.

Polecats—ten-daily, a dose of 100 m/kg of body weight:
male polecats—in the pre-rutting and rutting periods;
female polecats and other sex-age groups from February 1 to June 1.

Sables—ten-daily, a dose of 100 mg/kg of body weight:
male sables—in the pre-rutting and rutting periods;
female sables and other sex-age groups from January 1 to June 1.

In poultry farming, the preparation is administered together with formula feeds, most efficiently in the composition of low-nutrient feed mixtures. The RIAL biopreparations should be introduced into formula feeds by steps: first mixing them with 0.5–1 kg of formula feed, then with 5–10 kg of formula feed, and mixing this amount of feed with 1 t of formula feed.

The daily doses of the RIAL biopreparation are:
broiler chickens—330–550 g per 1 t of feed within the first or entire growing period;
laying hens—375–625 g per 1 t of feed within the productive period.

In apiculture, the preparation is mixed with syrup for feeding the colonies in spring and autumn. First, the preparation is dissolved in a small amount of water, poured into the syrup and mixed. The syrup is given in warm weather in upper and side feeders.

In spring, the preparation is used as a stimulating addition to step up the growth of bee colonies—a liter of syrup per colony at 3–5 day intervals, 150 m/l of the RIAL biopreparation.

In autumn, the preparation is used to improve wintering of bee colonies in case of scarcity of feed reserves. For this purpose, the sugar syrup is mixed with 50 mg/l of the RIAL biopreparation.

When used in recommended doses, the RIAL biopreparation causes no side effects and complications. There are no contraindications.

The advantages and specific features of the present group of inventions will be understood from the following description of the effect of the RIAL biopreparation on the physiological parameters of agricultural animals, poultry and bees as illustrated by examples below.

EXAMPLE 1

Effect of Various Dosages of the RIAL Biopreparation on Productive Capacities of Sheep A series of scientific and economic and physiological experiments has been conducted at the physiological station of the "Temnolesskoye" farm of VNIIOK (All-Union Research Institute of Sheep and Goat Breeding) on merino sheep of the Stavropol breed. The groups of pregnant ewes, lambs and tupping rams have been formed on the principle of analog pairs, taking in account the pregnancy time, time of delivery and body weight of lambs, also body weight and reproductive ability of sires.

In each experiment, the animals were fed identically in accordance with the feeding standards for individual sex-age groups.

The RIAL biopreparation was administered to pregnant ewes, lambs and tupping rams individually in morning hours.

TABLE 3

Body Weight of Lambs New-Born from Ewes which Received the RIAL Preparation 30 days before Lambing

| Animal group | No. of ewes | Body weight of ewes, kg | RIAL dose, mg/kg | Body weight of new-born lambs, kg | |
|---|---|---|---|---|---|
| | | | | singles, kg | twins, kg |
| 1st exper. | 20 | 61.8 | 10 | 5.2 | 3.7 |
| 2nd exper. | 20 | 61.6 | 30 | 5.7 | 3.6 |
| Control | 20 | 60.5 | — | 5.1 | 3.2 |

It follows from Table 3, that feeding the pregnant ewes before lambing with the RIAL biopreparation influences the body weight of lambs which testifies that the RIAL biopreparation is an efficient exogenic plastic material contributing to the weight gain of sheep particularly at the embryonic development stage.

The same is confirmed by the data of Table 4 showing that the plastic material of the RIAL biopreparation can be carried with blood into ewe's milk and passed over to the offsprings in the form of additional albuminous, nitrous, fatty and mineral substances, and be reliably increased in the blood of young sheep due to its dosed administration from the first days after the birth.

TABLE 4

Chemical Composition of Milk of Ewes Fed with Various Doses of RIAL 30 Days before Lambing

| Composition, % | RIAL dose, mg/kg | | Control, % |
|---|---|---|---|
| | 10 | 30 | |
| Total nitrogen | 0.91 | 1.15 | 0.84 |
| Albumin | 5.55 | 6.19 | 5.29 |
| Ash | 1.03 | 1.11 | 0.97 |
| Calcium | 0.20 | 0.21 | 0.18 |
| Phosphorus | 0.12 | 0.13 | 0.12 |
| Fat | 5.8 | 6.6 | 5.2 |
| Total sulfur | 0.04 | 0.04 | 0.04 |
| Sugar, g/100 ml | 5.8 | 5.11 | 4.92 |

In the dosed administration of the RIAL biopreparation to single lambs in the course of 1 month after the birth, the figures of body weight gain within this month in experimental groups were 4.1 kg higher than those of the control groups.

The best weight gain of lambs was obtained by administering the RIAL biopreparation mixed with concentrated feeds from the age of one month. In this case, the weight gain of lambs' body weight was 0.8–1 kg higher than that in the group of control animals.

Survival rate of lambs in experimental groups was higher than that of control animals.

In experiments on rams with normal and low sexual potency, the sexual activity of sires, quantitative and qualitative indices of their sperm product were examined ten-daily in the course of the experiment, prolonging the time to one month after completing the administration of RIAL to rams.

It has been established that administration of the RIAL biopreparation in the doses of 10 and 30 mg/kg of body weight to tupping rams with a normal sexual potency curtails the time for obtaining the ejaculate by 44.0% and 61.18% whereas the reduction of time in the control group amounts only to 33% due to physiological treatment of animals.

The reduction of time required for ejaculation in the group of rams with a low sexual potency is 49% while it stays unchanged in the control group.

40–60 days after administration of the RIAL, the concentration of spermatozoons in the ejaculate grows by 12–15%.

EXAMPLE 2

Effect of RIAL on Working Capacity and Physiological Parameters of Trotting Horses Participating in Hippodrome Races Experiments have been conducted in the course of 4 months (June to October) with the horses of Russian and American trotting breeds on the Moscow Central Hippodrome.

The conditions of keeping, feeding and care of the experimental horses complied fully with the zootechnical norms and veterinary-sanitary requirements.

All horses were put under ordinary training loads and were tested in accordance with the training and racing system recommended by the VNIIK (All-Union Research Institute of Horse Breeding).

Within the entire period of tests, the experimental horses were under constant veterinary control and their behavior in box stalls and during training were systematically observed.

The RIAL biopreparation was administered to each horse individually at dinner time at ten-daily intervals in a dose of 30 mg/kg of body weight.

The average briskness of horses on all heats within the testing time was found by summing up the brisknesses of all heats within the testing period and dividing them by the number of heats within the testing period.

The "success percentage" and distance parameters were calculated by the formula:

$$\% \text{ success} = \frac{\text{No. of I places} + \text{No. of II/2} + \text{No. of III/3} + \text{No. of IV/4}}{\text{number of heats}}$$

The effect of administering the RIAL biopreparation on working capacity of horses is given in Tables 5 and 6.

TABLE 5

Characteristics of Experimental (E) and Control (C) Groups of Horses

| Group | No. of horses | Average best briskness at beginning of experiment, min.s | Winnings at beginning of experiment, rbl |
|---|---|---|---|
| E | 15 | 2.20.19 | 884–85 |
| C | 15 | 2.19.63 | 993–15 |

In the opinion of horse trainers, the horses which received RIAL preparation have preserved their stamina throughout the entire distance of the heat. They do not loose the running tempo at the last quarter of the round which often is the case with control horses. This opinion can be confirmed by calculating distance parameters from the following formula:

$$\alpha = \frac{\Sigma \partial v}{N},$$

where
$\alpha$—distance parameter
$\partial v$—distance of races won in group
$N$—number of horses in a group $$\alpha_{exp} = \frac{2400}{15} = 1660 \qquad \alpha_{cont} = \frac{9600}{15} = 640$$

TABLE 6

Working Capacity Parameters of Experimental (E) and Control (C) Horses within Testing Period

| Group | Aver. best briskness, min.,s | Improvement of own record, aver., s | Aver. briskness of all heats, min.,s | Aver. winning, points | Aver. % of success | Distance parameters |
|---|---|---|---|---|---|---|
| E | 2.15.0 | 5.20 | 2.17.23 | 1071–27 | 29.27 | 1600 |
| C | 2.17.03 | 2.6 | 2.18.82 | 810–23 | 21.73 | 640 |

The average briskness of the horses which received a course of RIAL was 2.17.23 while that of control horses within the testing period was 2.18.82.

It can be seen from Tables 5 and 6 that administering the RIAL preparation exerts a favorable effect on the horses which undergo training and suffer heavy physical loads in stress situations.

Thus, the use of RIAL discloses the potential working capacity of a particular specimen which raises substantially its chances to join the pedigree stock.

The results of blood tests of control and experimental horses are summarized in Table 7.

TABLE 7

Results of Horse blood sample analysis

| Parameter | Group | Sample series | | | | |
|---|---|---|---|---|---|---|
| | | I | II | III | IV | V |
| Bactericidal activity | E | 14.07 + 9.47 | 13.88 + 9.87 | 37.60 + 5.93 | 39.27 + 7.93 | 53.07 + 2.23 |
| | C | 21.97 + 9.81 | 24.27 + 5.51 | 36.97 + 8.59 | 32.29 + 7.71 | 50.59 + 5.85 |
| Lysozyme activity | E | 2.58 + 0.72 | 3.89 + 2.24 | 3.74 + 0.98 | 3.94 + 0.82 | 4.01 + 0.88 |
| | C | 3.19 + 0.94 | 3.83 + 1.55 | 4.90 + 0.84 | 3.76 + 0.88 | 3.36 + 0.73 |
| Fractional composition of blood serum proteins, % | | | | | | |
| Gamma-globulin | E | 17.45 + 4.96 | 20.55 + 3.36 | 22.08 + 4.69 | 24.46 + 4.55 | 24.69 + 3.14 |
| | C | 20.17 + 12.57 | 23.27 + 4.12 | 19.71 + 2.98 | 22.72 + 7.10 | 22.93 + 3.40 |

In all series of analyses, the content of gammaglobulin in experimental animals is larger than that in the control animals while staying within the limits of the physiological norm which gives ground to a substantiated conclusion about the stimulating effect of the RIAL biopreparation on synthesis of immunoglobulins and on increasing the level of natural resistance of horses.

The data on determining the activity of lysozyme in blood serum of horses characterize the state of non-specific resistance of animals. As can be seen from Table 7, there was a tendency for an increase in the lyzosyme activity in the blood serum of the experimental group of horses.

The bactericidal activity of blood serum also reflects the level of non-specific resistance. This parameter depends to a considerable extent on the condition of an animal, season of the year, conditions of work, feeding, etc.

The horses of the control group had a sufficiently high immonological status with respect to this parameter.

In the first and second months of observation, the resistance of experimental horses was less pronounced. However, already by the third month this parameter in the experimental horses was higher than that in the control group. Later on, this tendency stays to the end of the experiment with steady aftereffect of the RIAL preparation (one month after the end of RIAL administration the bactericidal activity index was 53.07% in the experimental group and 50.59% in the control one).

The use of the RIAL biopreparation in the ration of horses produced the following results:

briskness of experimental horses improved by 2.6 s as compared with control animals;

"success percentage" of experimental horses increased by 8.24% as compared with control animals;

number of points won by experimental horses increased by 261.04 as compared with control animals;

experimental horses stayed in good sporting form throughout the racing season;

improved endurance of horses.

The RIAL biopreparation:

maintains the content of proteins in blood serum at a sufficiently high level (within the limits of physiological norm);

exerts a stimulating effect on the synthesis of gamma-globulins thereby raising the resistance of animals;

reduces the concentration of nitrous substances and lactic acid in blood of horses which testifies to a favorable effect of the preparation on protein and energy metabolism;

influences the non-specific resistance of the organism, increasing the lysozyme and bactericidal activity of blood serum in horses;

maintains concentration of hemoglobin in blood within the limits of physiological norm thus improving the working capacity and endurance of horses.

EXAMPLE 3

Determining Efficiency of the RIAL Biopreparation in Pig Breeding

Three scientific-economic experiments on the pigs of a new Russian meat breed CM-1 were conducted in the State Farm "Snezhny" of Magadan region.

In experiment I, the effect of various preparation doses on reproductive properties of sows were determined (Table 8).

TABLE 8

Experiment I

| Group | No. of pigs | Dose of RIAL per 1 kg of body weight, mg | Feeding conditions |
|---|---|---|---|
| I control | 15 | 0 | — |
| II exper. | 16 | 10 | daily from first day of coupling to weaning of piglets |
| III exper. | 16 | 25 | daily from first day of coupling to weaning of piglets |
| IV exper. | 18 | 40 | daily from first day of coupling to weaning of piglets |

Experiments II and III (Tables 9 and 10) were devoted to studying the effect of different RIAL doses on fattening of piglets.

TABLE 9

Experiment II

| Group | No. of piglets | Dose of RIAL per 1 kg of body weight, mg | Feeding conditions | Feeding period, days |
|---|---|---|---|---|
| I control | 22 | 0 | — | 0 |
| II exper. | 20 | 10 | daily | 30 |
| III exper. | 22 | 30 | " | 30 |
| IV exper. | 21 | 50 | " | 30 |

TABLE 10

EXPERIMENT III

| Group | No. of piglets | Dose of RIAL per 1 kg of body weight, mg | Feeding conditions | Feeding period, days |
|---|---|---|---|---|
| I control | 22 | 0 | — | 0 |
| II exper. | 21 | 50 | daily | 30 |
| III exper. | 21 | 50 | every other day | 15 |

The efficiency of the RIAL biopreparation was determined by comparing the results in control and experimental animals and expressing the difference in percent. All the obtained data were processed biometrically and appear in Table 11.

TABLE 11

Differences Expressed in Percent to Control (I) Group ("+" and "−" stand for improved and negative results, respectively)

| Parameter | I | II | III | IV |
|---|---|---|---|---|
| Experiment I (reproductive abilities) | | | | |
| Multiple pregnancy | 100 | +5 | +7 | +5 |
| Macrofetation | 100 | +44 | +67 | +67 |
| Lactoscence | 100 | +23 | +23 | +27 |
| 2-month piglets: | | | | |
| number of piglets | 100 | +21 | +31 | +28 |
| mass of one piglet | 100 | +9 | +14 | +16 |
| weight of litter | 100 | +31 | +47 | +45 |
| Survival rate from birth to weaning | 100 | +14 | +21 | +21 |
| Average of 7 parameters | 100 | +21 | +30 | +28 |
| Experiment II (fattening and meat characteristics obtained after administering different doses of RIAL) | | | | |
| Age of reaching 100-kg weight | 100 | +3 | +13 | +17 |
| Weight gain during fattening | 100 | +5 | +23 | +32 |
| Fodder consumption | 100 | +4 | +8 | +12 |
| Average of 3 parameters | 100 | +4 | +15 | +20 |
| Thickness of lard | 100 | +6 | +10 | +14 |
| Experiment III (different-methods of feeding RIAL) | | | | |
| Age of reaching 100-kg weight | 100 | +13 | +12 | |
| | 100 | +24 | +21 | |
| | 100 | +9 | +10 | |
| | 100 | +15 | +14 | |
| | 100 | +13 | +10 | |

It follows from Table 11 that the RIAL preparation used as an addition to the rations of sows and piglets is extremely effective. A dose of 10–40 mg/kg and 10–50 mg/kg of body weight added to the ration of sows and gilts, respectively, # improves the productivity parameters in comparison with the animals of the control group.

Multiple pregnancy of sows increases by 5–7%, macrofetation, by 44–67%, and lactoscence, by 23–27%. At two months of age of weaned piglets, the number of piglets in a litter increases by 21–31%, the mass of one piglet by 9–16%, and the weight of litter by 14–21% as compared with control animals.

The age of fattening piglets reaching a 100-kg body weight is reduced by 3–17%, the average daily gains are increased by 5–31%, and fodder consumption is reduced by 4–12%. The thickness of lard above the 6–7 thoracic vertebra is 6–14% smaller than that of the control animals.

The optimum doses of the RIAL preparation are 25–40 mg/kg of body weight of a sow and 30–50 mg/kg of a gilt.

The most rational method for fattening young pigs is administering the RIAL preparation for a month, every other day, beginning from the first day of fattening.

EXAMPLE 4

Determining Efficiency of RIAL Biopreparation in Poultry Farming

Investigations have been carried out on cage-kept broiler chickens (cockerels and pullets) of "Hybro-6" cross in groups of 50. Duration of the experiment was two months. The keeping conditions satisfied the recommendations in effect. The broiler chickens and laying hens were given full-ration formula feeds.

The results of investigations are summarized in the following tables.

TABLE 12

Consumption of Fodder per 1 kg of Weight Gain

| Group | RIAL additions, mg/kg of body weight | Duration of experiment, days | Fodder consumption per 1 kg of weight gain | % of control group |
|---|---|---|---|---|
| Experiment 1 | | | | |
| 1 contr. | — | 49 | 2.36 | 100 |
| 2 exper. | 30 | 49 | 2.21 | 93.6 |
| 3 exper. | 50 | 49 | 2.25 | 95.3 |
| Experiment 2 | | | | |
| 1 contr. | — | 49 | 2.45 | 100 |
| 2 exper. | 30–50 | 28 | 2.36 | 96.3 |
| 3 exper. | 30–50 | 49 | 2.36 | 96.3 |

It follows from Table 12 that fodder consumption per 1 kg of weight gain in experimental groups is lower than it is in the control group.

A higher difference in fodder consumption is registered in case of the low nutrient values of formula feeds due to better digestibility and the use of nutrient substances of fodder.

Table 13 summarizes the data on the effect of RIAL additions on the body weight of chickens.

TABLE 13

Average Body Weight of Cockerels and Pullets, g

| Group | Weight in 4 weeks g | % | Weight in 7 weeks g | % | Body weight gain, g |
|---|---|---|---|---|---|
| 1 contr. | 694.8 | 100 | 1550.8 | 100 | 30.9 |
| 2 exper. | 741.2 | 106.6 | 1642.1 | 105.8 | 32.8 |
| 3 exper. | 719.98 | 103.5 | 1618.3 | 104.3 | 32.3 |

RIAL additions to standard formula feeds given to chickens in doses of 30 and 50 mg/kg of body weight have contributed to increased weight gain of broilers by 3.5–6.6% at the age of 4 weeks and by 4.3–5.8% at 7 weeks of age.

The use of RIAL in feeding energetically low nutrient formula feeds has contributed to weight gain of control chickens by 3.0–6.6% after 4 weeks and by 2.8–7.4% after 7 weeks.

All groups have demonstrated a positive effect when RIAL was used in low-nutrient feed mixture. In this case, the body weight of experimental chickens has reached that of the control chickens when the latter have received a normal energetically-balanced ration which points to the expediency of using the RIAL biopreparation in low-nutrient rations of poultry.

The investigation of meat quality of chickens has proved that the meat of experimental chickens is noted for a high quality and features a tendency to a higher (by 2.2%) yield of edible parts in carcasses.

The chemical composition of meat is within the norm for the given age bracket of chickens.

Introduction of the RIAL biopreparation into the rations of laying hens at the rate of 30 and 100 mg/kg of body weight raises their productivity by 1.9%. The consumption of fodder per 10 eggs is reduced by 2.62%.

The incubating properties of eggs and hatching of chickens in all groups have improved. The chemical composition of eggs has been within the limits of the physiological norm.

EXAMPLE 5

Determining Efficiency of RIAL Biopreparation in Apiculture

The efficiency of RIAL doses has been determined by the effect of the preparation on bees in laboratory conditions. To produce uniage bees, honeycombs with mature bee brood have been taken from a bee colony, placed into single-frame isolators and transferred into thermostat TPS-3 at a temperature of 34° C. and a relative air humidity of 70%. Groups of 50 bees at the age of up to 24 hours have been placed into enthomological live boxes and kept at 28° C. Every three days they have been given sugar syrup with RIAL.

The number of perished bees was registered daily in the live boxes. In addition, the condition of middle and hind intestines and consistency of fecal matter were inspected in experimental bees.

15 doses of the RIAL biopreparation were tested, three times each, in 48 live boxes. The results of the experiment appear in Table 14 which demonstrates that the bees receiving sugar syrup with 50 mg/l of RIAL lived for 21 days which is three days longer than the control bees. The bees of this group had the smallest filling of hind intestine with feces.

TABLE 14

Effect of RIAL on Life Span of Bees and Condition of Their Hind Intestine

| | On the 9th day of test, n = 20 | | |
|---|---|---|---|
| Dose of RIAL, mg/kg | Life span, days, n = 150 | aver. wt of hind intestine with contents, mg/bee | condition of hind intestine, points |
| 10–20 | 15 | 30 | 2 Intestine wall loose, filled with liquid, homogeneous, easily spreading excrements, only partly removable from belly |
| 30–40 | 14 | 20 | 2 |
| 50 | 21 | 14 | 4- Intestine retains fully its structure, completely and easily removable, wall flexible, non-rupturing, holds excrements well: muscles clearly seen with tracheas in the form of white threads |
| 60–140 | 14 | 22 | 2 |
| 150 | 14 All bees perished at time | 24 | 3- Intestine completely removable with non-rupturing walls filled with slowly spreading homogeneous excrements |
| Contr. | 18 | 20 | 2 |

The shortest life span (6 days) was observed in bees given syrup with 30 mg/l addition of RIAL. The life span of bees in live boxes given other doses of the preparation was 14–15 days.

It should be noted that the bees fed with the preparation in 150 mg/l of syrup exhibited high mobility up to the 14th day and then they perished.

The best dose of the preparation—50 mg/l—and a doubtful dose—150 mg/l—have been tested on bee colonies in the bee growing period, i.e. in July–August.

The test involved counting the amount of brood and honey and forming three 10-colony groups analogous in vitality, amount of brood and honey. All colonies were given a liter of sugar syrup three times at three-day intervals. The first (control) group received syrup without additions, the second one, syrup with a 50 mg/l dose and the third group, syrup with a 140 mg/l dose.

Within three periods after supplementations, each group of colonies receiving syrup with 50 mg/l and 150 mg/l of the preparation has grown on the average 23 and 21 thousand specimens, respectively, while in the control group the result was 17.7 thousand specimens.

The optimum dose of the RIAL addition to sugar syrup for feeding-up the bees was found to be 50 mg/l.

At the bee growing time in spring and in August, the bee colonies may be given stimulating supplements with 50 and 150 mg/l doses of the biopreparation.

To determine the effect of the RIAL biopreparation on the wintering bees, the colonies were kept in simulated wintering conditions in climatic chambers at 6° C. and a relative air humidity of 72%.

For this purpose the test consisted in picking up eight bee colonies, removing the brood from them on the June 11th, reducing the number of beeways to 7–8 and feeding each colony with 7 l of syrup. Four colonies received syrup with the best dose of RIAL, i.e. 50 g/l, while the other four, sugar syrup without any additions. On the 5th of June, the colonies were placed into climatic chambers where they stayed to September 15.

In the middle of June and September, samples of bees were taken for determining some of their physiological parameters.

It was found that mortality of bee colonies feeding on sugar syrup with RIAL addition in the climatic chamber was two beeways, while in the control colonies it was 0.5 beeways higher. The control colonies used 0.3 kg more feed with the resultant increase in excrement load.

The catalase of rectal glands in the bees of experimental group proved to be higher which is an evidence that the use of the RIAL biopreparation improves the winter hardiness of bee colonies.

Thus, the tests have demonstrated that feeding the bees with the addition of the RIAL preparation (50 mg/l of sugar syrup) in any bee garden counting from 100 bee colonies with population in May varying from 3.5 to 5 beeways makes it possible to grow 30 additional bee packages. In a honeyproducing bee gardens every 100 colonies can produce additionally 550 kg of honey.

INDUSTRIAL APPLICABILITY

The present group of inventions can be used to advantage in animal breeding, fur farming, poultry farming and apiculture for feeding various groups of agricultural animals, fowl and bees.

We claim:

1. A biopreparation comprising the following in terms of weight percent:

| Amino Acids | |
|---|---|
| Free | 30–40 |
| Fixed | 30–55 |
| Lipids | 0.01–2 |
| Macronutrients | |
| Fe, Ca, Na, K, P, Mg, S, Cl | 2–6 |
| Microelements | |
| Mn, Zn, Cu, Sb, As, Sn, Mo, Bi | 0.5–1.5 |
| Compounds of non-metals, excluding monosugar | 8–12 |
| Carbohydrates | 0.001–0.1 |
| Moisture | 4–10. |

2. A method for feeding an animal involving introduction of a biopreparation into its ration CHARACTERIZED in that the biopreparation is the biopreparation of claim 1.

3. The method of claim 2 CHARACTERIZED in that the biopreparation is introduced into the ration of poultry in a dose of 330–625 g/t of feed.

4. The method of claim 2 CHARACTERIZED in that the biopreparation is used in apiculture by adding it to sugar syrup in a dose of 50–150 mg/l of syrup.

5. The method of claim 2 in which the animal is poultry.

6. The method of claim 2 in which the animal is a bee.

7. The method of claim 2 in which the animal is a sheep.

8. The method of claim 2 in which the animal is a horse.

9. The method of claim 2 in which the animal is a swine.

* * * * *